United States Patent [19]
Bennett, Jr. et al.

[11] 3,763,424
[45] Oct. 2, 1973

[54] METAL DETECTOR FOR IDENTIFYING AND DISCRIMINATING BETWEEN OBJECTS OF DIFFERENT SIZE, SHAPE, ORIENTATION AND FERROUS CONTENT AND INCLUDING AN AUTO NULLING CIRCUIT

[75] Inventors: Clarence L. Bennett, Jr., Groton; Joseph D. DeLorenzo, Sudbury; Harald Wilhelmsen, Carlisle, all of Mass.

[73] Assignee: Sperry Rand Corporation, New York, N.Y.

[22] Filed: July 15, 1971

[21] Appl. No.: 162,884

[52] U.S. Cl. ............................ 324/41, 340/258 C
[51] Int. Cl. ............................................ G01r 33/00
[58] Field of Search ........................... 324/41, 3; 340/258 R, 258 C

[56] References Cited
UNITED STATES PATENTS

| 2,179,240 | 11/1939 | Breitenstein | 324/41 |
| 3,020,470 | 2/1962 | Shawhaw et al. | 324/41 |
| 3,292,080 | 12/1966 | Trikilis | 324/41 |
| 3,549,985 | 12/1970 | Penland | 324/3 |
| 3,573,784 | 4/1971 | Bachofer | 324/41 X |
| 3,588,685 | 6/1971 | Fallenius | 324/41 |

FOREIGN PATENTS OR APPLICATIONS

| 403,460 | 4/1943 | Italy | 340/258 R |
| 480,447 | 1/1952 | Canada | 324/41 |

OTHER PUBLICATIONS
Leslie, E., How Mine Detectors Work, Radio Craft, July 1946, pp. 676, 677 & 721.

Primary Examiner—Robert J. Corcoran
Attorney—Howard P. Terry

[57] ABSTRACT

A metal detector comprising a sensor coil positioned relative to an excited field coil for minimum mutual inductive coupling therebetween to provide a null output from the sensor coil in the absence of objects to be detected. The coils are rigidly secured in a lightweight epoxy casting to preclude deformation of the coils and relative displacement therebetween under varying environmental conditions to preclude drift of the null output. Low frequency excitation on the order of a few hundred up to a few thousand hertz is applied to the field coil to obtain a high degree of insensitivity to moisture conditions existing in the vicinity of the detector for further maintaining constancy of the null output. An auto-nulling circuit for automatically compensating for any long term drift of the detector output is also optionally included.

2 Claims, 11 Drawing Figures

INVENTORS
CLARENCE L. BENNETT JR.
JOSEPH D. DE LORENZO
HARALD WILHELMSEN
BY

ATTORNEY

METAL DETECTOR FOR IDENTIFYING AND DISCRIMINATING BETWEEN OBJECTS OF DIFFERENT SIZE, SHAPE, ORIENTATION AND FERROUS CONTENT AND INCLUDING AN AUTO NULLING CIRCUIT

BACKGROUND OF THE INVENTION

1. Field of the Invention

The present invention relates to metal detecting apparatus and more particularly to improvements therein resulting in decreased sensitivity to environmental conditions, automatic compensation for long term drift of the detector output, and enhanced discrimination capability based on the size, shape, orientation and ferrous nature of the objects to be detected. Use of the invention in a variety of applications such as security systems, tramp metal detectors and monitoring of manufacturing processes is envisioned. 2. Description of the Prior Art Presently available metal detecting devices of the treasure-finding variety are relatively inexpensive units comprising field and sensor coil windings generally on the order of 12 to 24 inches in diameter operated at a frequency of about 100 KHz and mounted on an insulating member such as a piece of Masonite affixed to one end of an operator handle. The high operating frequency makes these devices extremely susceptible to drift caused, for example, by damp earth, vegetation or the presence of humans, and therefore necessitates constant operator monitoring to preclude a high false alarm rate. Other more sophisticated and usually more costly detectors typically operate at a frequency on the order of 20 KHz or higher. This lower operating frequency reduces the drift sufficiently to avoid the necessity for continuous operator monitoring. Nevertheless, even at this lower frequency, the detectors are still adversely affected to an intolerable extent by moisture conditions thereby rendering them unsuitable for high accuracy applications in which a capability for distinguishing between metal objects of only slightly different size or shape is required.

Prior metal detectors are also subject to false alarms caused by deformation of the detector coil windings resulting from shock, vibration, changes in thermal conditions and other environmental factors.

It is therefore a principal object of the present invention to provide an improved metal detecting apparatus which is substantially insensitive to moisture conditions and essentially free of errors arising from coil deformation. Another object of the invention is to provide an auto-nulling circuit which automatically compensates for long term drift of the detector output to inhibit false alarms and improve operational accuracy of the detector apparatus. A further object of the invention is to provide metal detection apparatus operating in conjunction with a conveyor unit carrying objects to be detected whereby the motion of the object relative to the detector produces a unique signal waveform at the detector output indicative of one or more of various characteristics of the objects, such as size, shape, etc.

SUMMARY OF THE INVENTION

The present invention overcomes the aforementioned limitations attendant to prior art detectors by the provision of apparatus constructed in such a manner as to be substantially free of unbalancing effects caused by varying temperature, shock and vibration conditions. This is accomplished by arranging the detector sensor coil winding in rigid proximate relation to the detector field coil winding and further so as to having essentially zero mutual inductive coupling relative to the detector field coil winding whereby in the absence of metal objects in the vicinity of the detector a zero or low residual output is obtained from the sensor winding. Another feature of the invention relates to its insensitivity to changing moisture conditions. This is achieved by operating in a frequency typically in the range of 200 to 4,000 hertz which is low enough to obtain the desired moisture insensitivity yet high enough to enable object detection independent of object velocity within certain limitations as will be described more fully in the subsequent detailed description of the preferred embodiments. The latter feature is of interest, for example, in a case where the objects to be detected or discriminated are carried past the detector by some means such as a conveyor belt.

In a preferred structural arrangement of the inventive apparatus, the two coils, namely the field coil which is energized by a driver oscillator and the sensor coil which is connected to an alarm circuit, are mounted in partially overlapping relation and rigidly secured relative to one another at the interior of a casting formed by lightweight epoxy plates arranged in sandwiched relation about a lattice of Styrofoam blocks. During fabrication of the detector, the positioning of the coils is adjusted to provide a zero or null output close to zero from the sensor coil. This result obtains under a condition of minimum mutual inductive coupling between the coils. By virtue of the rigidly secured coil construction, any deformation occurring in the structure from vibration, thermal stress, etc., has a substantially equal effect on both coils, to a first approximation, thereby minimizing relative displacement between the coils and maintaining the null output condition.

Another feature of the invention relates to the combination of the detector apparatus with conveyor means for carrying the objects to produce signature waveforms containing unique phase or amplitude information for identifying the objects in accordance with certain characteristics thereof.

A further feature of the invention relates to the provision of means for manually or automatically providing compensation for any residual or null output existing in the sensor coil as a result of unbalance or imprecise relative placement of the field and sensor coils.

DESCRIPTION OF THE PREFERRED EMBODIMENTS

Figure 1:
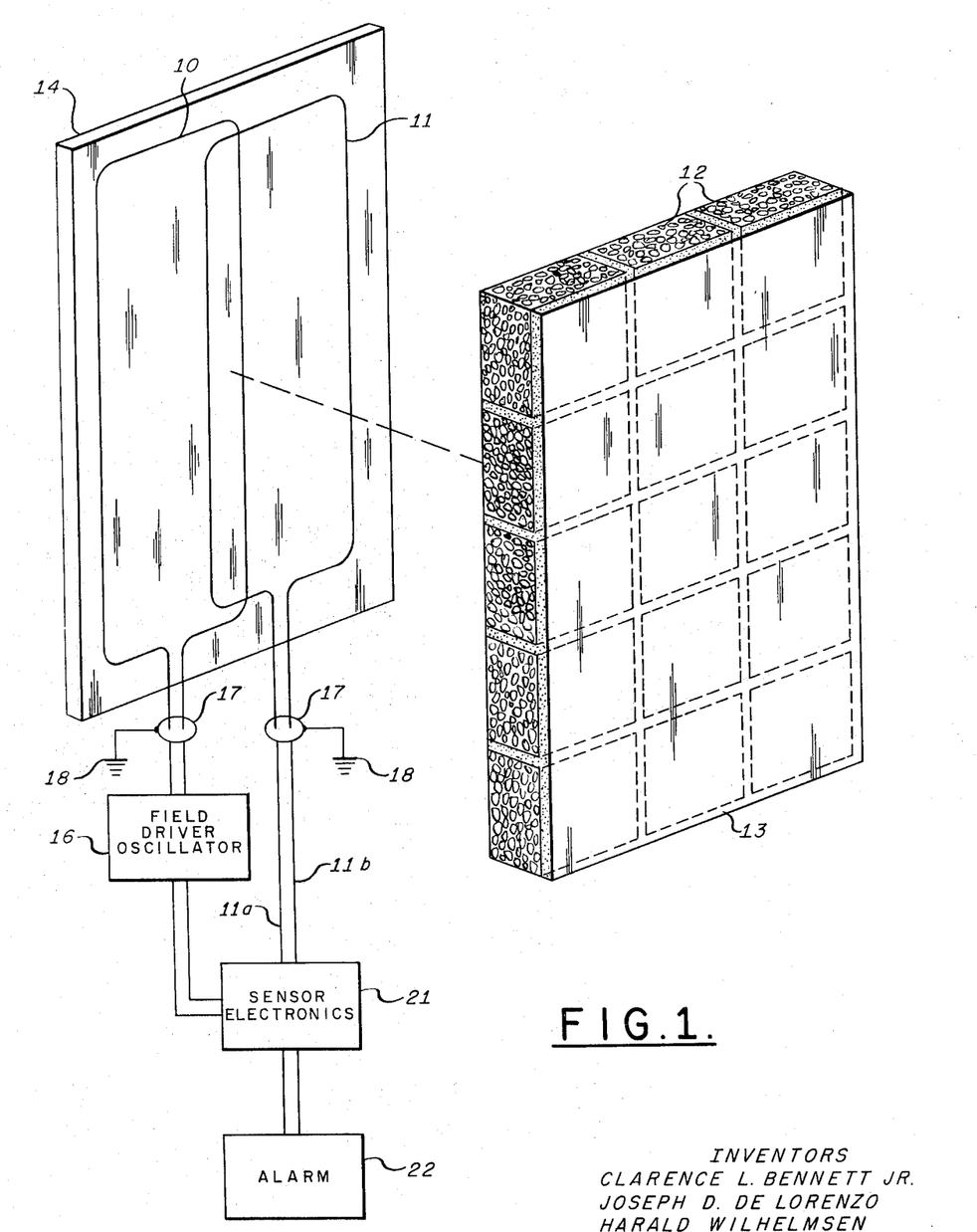
FIG. 1 is an exploded perspective view of the coil and casting construction used in the detector apparatus of the present invention.

Referring to FIG. 1, the coil assembly of a metal detector construction in accordance with the present invention comprises a field coil 10, a sensor coil 11, and a lattice of lightweight blocks 12 positioned between base and cover plates 13 and 14. In fabrication of the coil assembly, the base plate 13 is first formed with an epoxy material, such as Stycast 3180M available from Emerson Cumming Inc., Canton, Mass., by pouring the epoxy into a flat pan to a depth of about one-eighth inch. While the epoxy is still tacky the blocks are placed in position as indicated to adhere to the epoxy upon hardening. Then the field coil is laid over the blocks and secured thereto, as by gluing with a small amount of additional epoxy. Next, the sensor coil is positioned over the blocks and moved relative to the field coil in a plane parallel to the base plate 13 until the signal across the sensor coil output leads 11a, b reduces to zero or a small residual level. Under this condition, the mutual inductive coupling between the field and sensor coils is substantially at zero or a minimum practically attainable value. The nulling operation is performed with alternating current electrical excitation applied to the field coil from the field driver oscillator 16. Once the zero or small residual voltage condition is established, the sensor coil is also secured to the blocks and finally another layer of epoxy is poured over the coils and blocks to fill the spaces therebetween and form the cover plate 14 which is also about ⅛th inch thick. With due consideration for cost, rigidity, weight and thickness, as will be discussed more thoroughly in the following paragraph, resinous or plastic material having a specific gravity in the range of 0.8 to 2.0 is preferred for construction of the base and cover plates.

Although single turn coil windings are illustrated, it will be appreciated that multi-turn windings are preferred for practical reasons relating to signal transforming action for enhancing the detector output signal. A satisfactorily operated coil assembly included a field coil having 80 turns and a sensor coil of 300 turns each shielded by a conductive material designated by the circle 17 and connected to ground 18 to reduce interference from extraneous signals. The field coil of the operated assembly measured 9 inches in width by 49 inches in height. The sensor coil measured 8½ inches in width by 47 inches in height and was mounted in 3 inch lateral overlapping relation with the field coil in a cast assembly measuring 16 inches wide by 50 inches high and 1⅝ inches thick. The foregoing dimensions are intended to be illustrative only since it will be apparent to those skilled in the art that other dimensions and shapes could also be used for the coil construction. The significant feature of the coil assembly constructed according to the principles of the present invention is the decoupled arrangement of the coils in a lightweight planar structure having a high degree of rigidity for inhibiting bending about orthogonal axes in the major plane of the assembly. The thin planar configuration of the casting would ordinarily be quite flexible and easily susceptible to bending, with concomitant coil deformation, in the major plane formed by the 16 inch by 50 inch width and height dimensions unless provision is made to eliminate such flexibility. This is accomplished by increasing the thickness of the casting without appreciably increasing its weight. The necessary thickness for the desired rigidity could be achieved, for instance, simply by increasing the thickness of the base and cover plates from the indicated ⅛th inch thickness to perhaps about three-fourths of an inch. This approach is considered unsuitable, however, because of the resultant substantial increase in weight. The required rigidity is thus obtained with only a slight increase in weight by constructing the lattice of one inch thick blocks of an expanded resinous material such as Styrofoam having a specific gravity on the order of only 0.05.

In use of the detector, the balanced field condition resulting from the substantially zero or minimum inductive coupling between the field and sensor coils typically provides a small residual or unbalance signal across the sensor coil output leads in the absence of metal objects in the vicinity of the coils. Any residual signal that exists can be cancelled, as will be explained subsequently in greater detail, by applying a compensating signal from the field driver oscillator 16 to the sensor electronics 21 which includes a variable R-C network for adjusting the amplitude and phase of the compensation signal to effect the desired cancellation. Automatic compensation may also be provided as will be explained hereinafter with reference to FIGS. 2 and 3. On the other hand, in the presence of a metal object in the vicinity of the coils the balanced field condition is disturbed resulting in an increase in the signal strength at the sensor coil output, which upon reaching a predetermined threshold causes actuation of the alarm 22.

Figure 2:
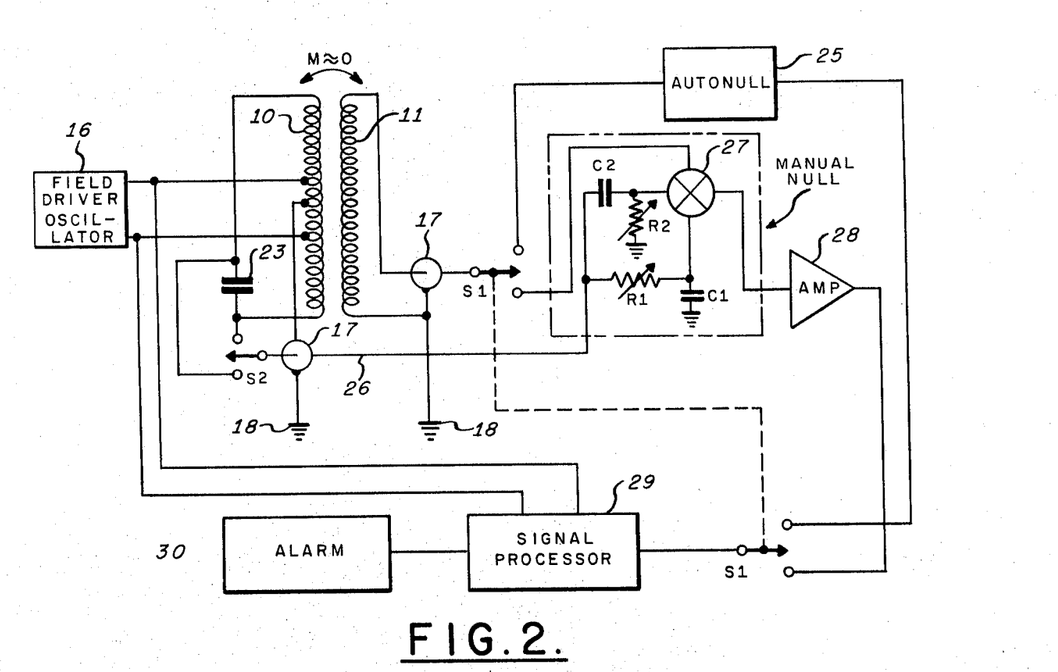
FIG. 2 is an electrical schematic illustrating the coil configuration of FIG. 1 interconnected with excitation and alarm and nulling devices.
Figure 3:
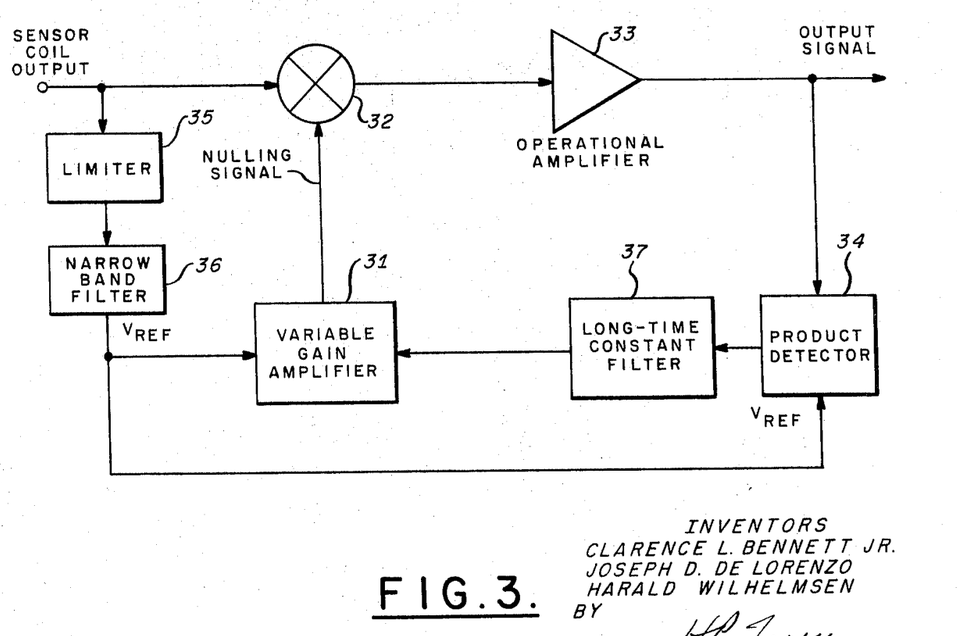
FIG. 3 is a schematic of the auto-nulling circuit included in FIG. 2.

The electrical circuit features of the detector are shown in greater detail in FIGS. 2 and 3 wherein like components appearing in FIG. 1 are identified by the same numeral designation. A capacitor 23 connected in parallel with the field coil 10 tunes the field circuit to a frequency in the range of the 200 to 4,000 Hz excitation provided by the field driver oscillator 16. As indicated in FIG. 2, the coupling between the field driver oscillator and the field coil is actually somewhat different than the simplified showing of FIG. 1 in that the driver oscillator is connected across only a portion of the field coil. In this way, auto-transforming action of the field coil is realized in addition to the transforming action between the field and sensor coils. Double pole-double throw switch S1 enables the sensor coil 11 to be connected to a manual null circuit 24 in the lower position of the switch and to an auto-null circuit 25 in the upper position of the switch. Thus, in the lower position of switch S1 the sensor coil signal feeds through the switch to the input of the manual null circuit which also receives field coil excitation via switch S2 and lead 26. The R-C components in the manual null circuit provide for adjusting the amplitude and phase of the field coil excitation, by means of varying resistors R1 and R2, prior to combining with the sensor signal in summing amplifier 27 to cancel the sensor coil residual output obtained in the absence of metal objects in the vicinity of the detector coil windings. The two R-C circuits provide compensation for both zero and quadrature phase components of the sensor coil residual signal through a range of 180° with switch S2 connected to one side of capacitor 23 and through another 180° with switch S2 connected to the other side of the capacitor. For all practical purposes a small residual output voltage always exists across the sensor coil as a consequence of finite coupling between the field and sensor coils and it is considered advantageous to use the foregoing null compensating technique in preference to striving for precise placement of the coils during manufacture to achieve a zero output. Narrowband amplifier 28 is tuned to the resonant frequency of the field coil circuit. Thus, in the presence of metal objects in the vicinity of the detector coils, at which time the sensor coil output exceeds the variable compensating signal derived from the field excitation, a signal is applied to the signal processor 29 and alarm 30 through the lower terminal of the other pole of switch S1. The signal processor includes conventional circuits for detecting the amplitude and/or phase of the sensor output signal as will be described more fully a little later with reference to FIGS. 4a to 4f.

In the upper position of switch S1 the sensor coil is connected to auto-null circuit 25 which in turn couples through the upper contact of the other pole of the switch into the signal processor and alarm. The auto-null circuit makes the detector self-adjusting and thus eliminates the necessity for re-nulling, as is required in the case of manual null operation, to correct for semi-permanent changes in the coil environment caused, for example, by the addition or removal of a large conductive stationary object in the vicinity of the detector coil. The auto-null circuit achieves this capability by automatically subtracting the long term average of the sensor coil output signal from its instantaneous value. This will be more fully understood after considering the following description of the auto-null circuit with reference to FIG. 3. Both the sensor coil output signal and a nulling signal derived from variable gain amplifier 31 are applied to a summing amplifier 32. The auto-null circuit is designed so that the nulling signal is 180° out of phase relative to the sensor coil output signal. Thus, in the case where the two signals are of equal amplitude, the summing amplifier output is zero and the gain of amplifier 31 remains unaffected. On the other hand, where the nulling and sensor coil signals are of different amplitudes, the summing amplifier output is applied through a high gain operational amplifier 33 to a product detector 34 wherein it combines with a reference signal $V_{REF}$ derived from the sensor coil. The reference signal is obtained by applying the sensor signal through a hard limiter 35 and a narrowband filter 36 tuned to the resonant frequency of the field coil circuit. The hard limiter functions in the conventional manner of a high gain amplifier and clipper circuit which clips the amplified signal at low positive and negative levels to obtain a square wave signal at the tuned frequency of the apparatus which is devoid of a substantial amount of the noise contained in the sensor coil output signal. The sensor coil output is used as a reference since its phase changes in accordance with the environment in which the detector is operating. In this way it is assured that the operational amplifier output signal applied to the product detector is either in phase or 180° out of phase with the reference signal. The product detector functions as a demodulator to provide a varying d.c. signal having an amplitude proportional to the operational amplifier output signal and a positive or negative polarity depending on the relative phase of the operational amplifier and reference signals. The product detector output in turn is applied through long time constant filter 37 to function as an automatic gain control voltage which regulates the amplitude of the reference signal coupled to amplifier 31 and thereby controls the nulling signal to be equal in amplitude and opposite in phase to the sensor coil output. The filter has a time constant typically on the order of several tens to several hundreds of seconds. The foregoing operation occurs therefore only for comparatively slow long term changes of the sensor coil output. Instantaneous changes of the sensor coil output in response to metal objects in the vicinity of the detector are precluded by the operation of the long time constant filter from affecting the gain of amplifier 31.

The filter also acts to block any a.c. noise components appearing in the product detector output signal. In addition, it should be noted that the product detector and filter function as narrow band tuning means in the same manner as the tuned amplifier 28 associated with the manual nulling circuit. More specifically, the auto-null circuit operates as follows. In the absence of conductive objects present near the detector coils the sensor coil output is at the residual level caused by the field and sensor coils not being exactly in zero mutual inductive coupling relation. If the nulling signal from the variable gain amplifier is at a level different from the residual voltage, a signal is produced at the output of summing amplifier 32 and applied through the high gain operational amplifier to the product detector which provides an output signal of appropriate polarity to change the nulling signal to a level equal to that of the sensor coil output. This operation obtains even in the presence of stationary or very slowly moving conductive objects near the detector coils. Any abrupt change of the sensor coil signal amplitude, however, resulting from comparatively fast motion of a conductive object relative to the detector is blocked by the long time constant filter and thereby rendered ineffective for adjusting the amplitude of the nulling signal. The operational amplifier output signal constitutes the output signal of the auto-null circuit which is fed to switch S1 for application to the signal processor and alarm.

FIGS. 4a to 4f illustrate the use of the invention for detecting and discriminating between different objects on the basis of amplitude and phase waveform signatures produced as the object moves past the detector. For simplicity of illustration, the field driver oscillator has not been included in these figures. The sensor electronics 21 includes the manual or auto-nulling circuits in addition to the switches, signal processor and alarm shown in FIG. 2. The amplitude waveforms are obtained with a conventional amplitude detector which derives the amplitude of the sensor coil output a.c. signal. Likewise, the phase waveforms can be obtained with a conventional phase detector which receives a reference signal from the field driver oscillator as shown applied to the signal processor in FIG. 2. Both the amplitude and phase waveforms may be presented on a recorder or storage scope for comparison with prerecorded reference signatures. The illustrated waveforms are representative of signatures obtained with a vertically oriented coil assembly 38 of the configuration shown in FIG. 1 mounted alongside a non-conductive conveyor belt 39 on which the respective objects are carried at a reasonably uniform speed. The absolute speed of the belt is of no particular consequence but it is important, of course, that the speed used during detection or identification be substantially the same as that used in determining the reference waveform signatures representative of the various objects. Alternatively, the belt speed during identification may be different than that used for obtaining the reference signatures if some means is provided for synchronizing the time axis of the waveform plot with the location of the object relative to the detector. In any case, it is required that the speed of the conveyor belt be sufficiently slow so that the object affects the detector output for at least several cycles of the excitation applied to the field coil. This speed requirement is thus related to the lower operating frequency limit of the coil assembly since obviously at a low frequency the belt speed must be reduced to meet the requirement that the object should affect the detector output for at least several cycles. A more important determination of the lower operating frequency, however, relates to the desirability of operating beyond the standard 60 hertz power line frequency and harmonics thereof up to about the third harmonic.

Figure 4A:
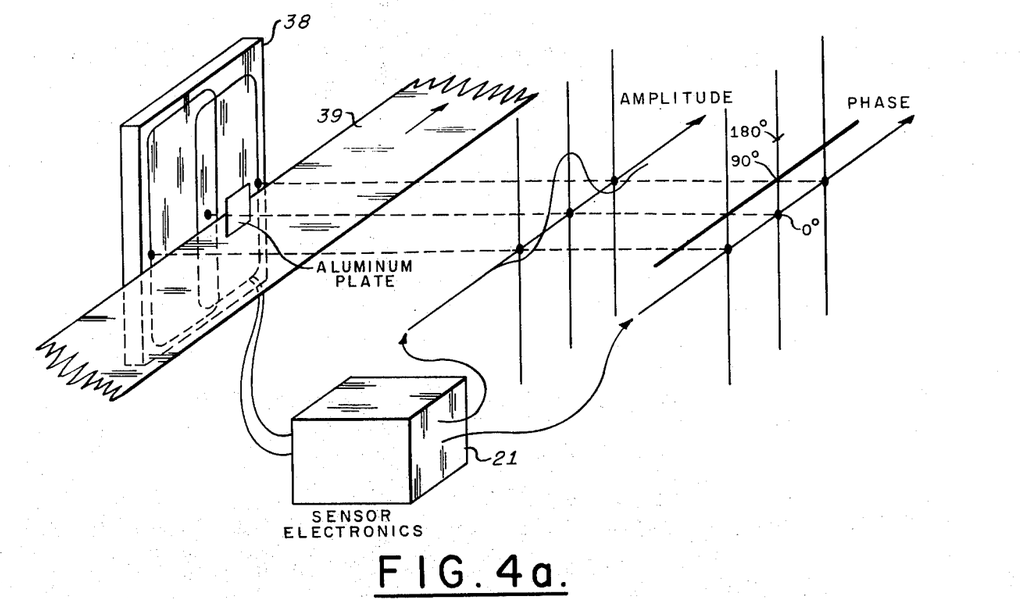
FIGS. 4a to 4f illustrate amplitude and phase waveform signatures produced at the detector output in response to various objects carried past a side mounted detector assembly.
Figure 4B:
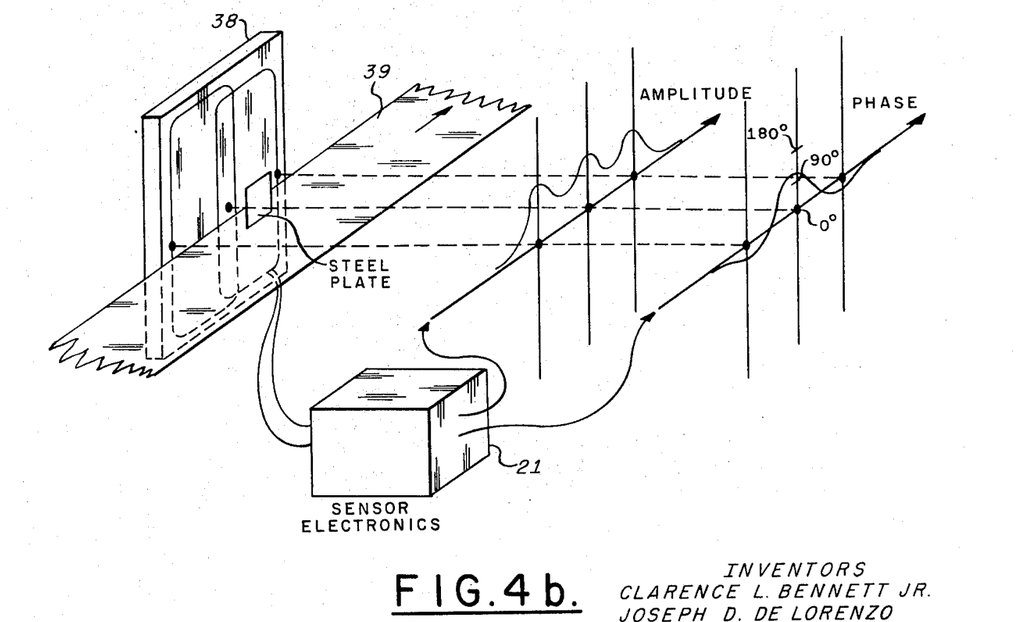

FIGS. 4a and 4b illustrate the waveforms provided by the detector in response to conductive ferrous and nonferrous plates of the same shape, size and orientation. In the case of FIG. 4a an aluminum plate is carried on the conveyor belt whereas in FIG. 4b the plate is made of steel. The amplitude signature for the aluminum plate has a small negative peak followed by a large positive peak which in turn is followed by another small negative peak. The amplitude signature for the steel plate is characterized by three positive peaks of approximately the same amplitude. Adequate discrimination between the steel and aluminum plates can be achieved from these amplitude waveforms which are clearly quite different. Discrimination may also be achieved by means of the phase signatures which in the case of the aluminum plate remains constant at 90° whereas for the steel plate it varies from −45° to +135° and back to −45°.

Figure 4C:
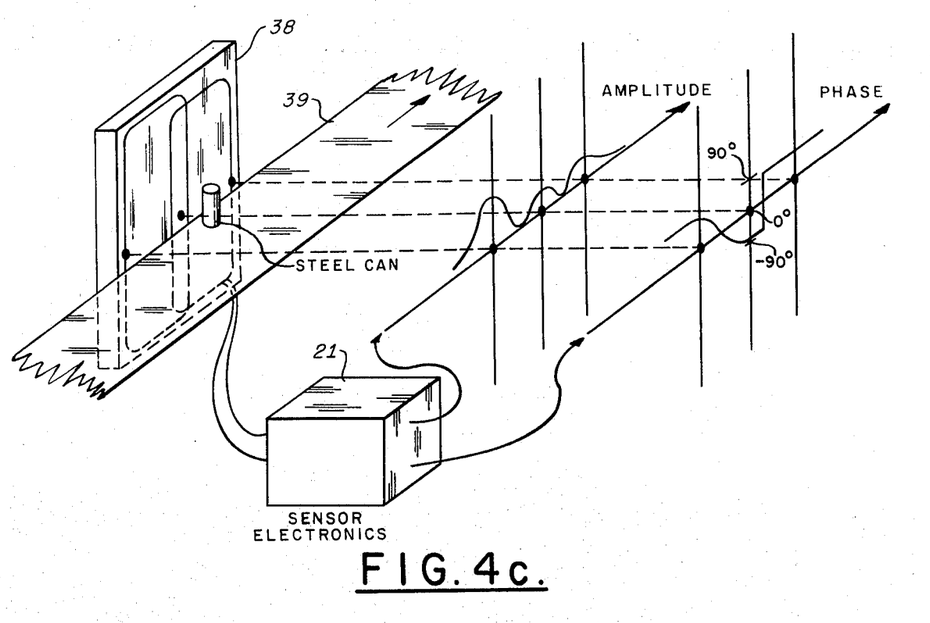
Figure 4D:
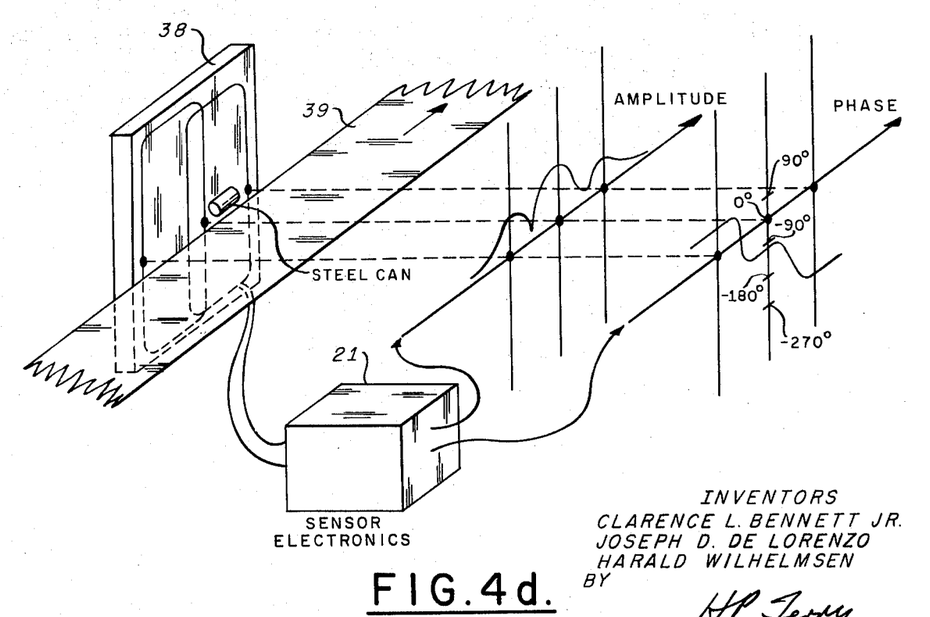

FIGS. 4c and 4d illustrate the waveforms obtained for the same steel can carried on the conveyor belt in vertical and horizontal orientations respectively. In the case of the vertically oriented can, the amplitude waveform includes a small central peak located between slightly larger side peaks, while for the horizontally oriented can the amplitude waveform has a large central peak with smaller side peaks. The amplitude waveforms thus provide a certain degree of discrimination but considerably greater discrimination is provided by the phase waveforms which are significantly different as indicated in the figures.

From a comparison of FIGS. 4a to 4d it is seen that the amplitude waveforms are all slightly different but that greater differences exist between the phase waveforms which are therefore preferred for discrimination purposes.

Figure 4E:
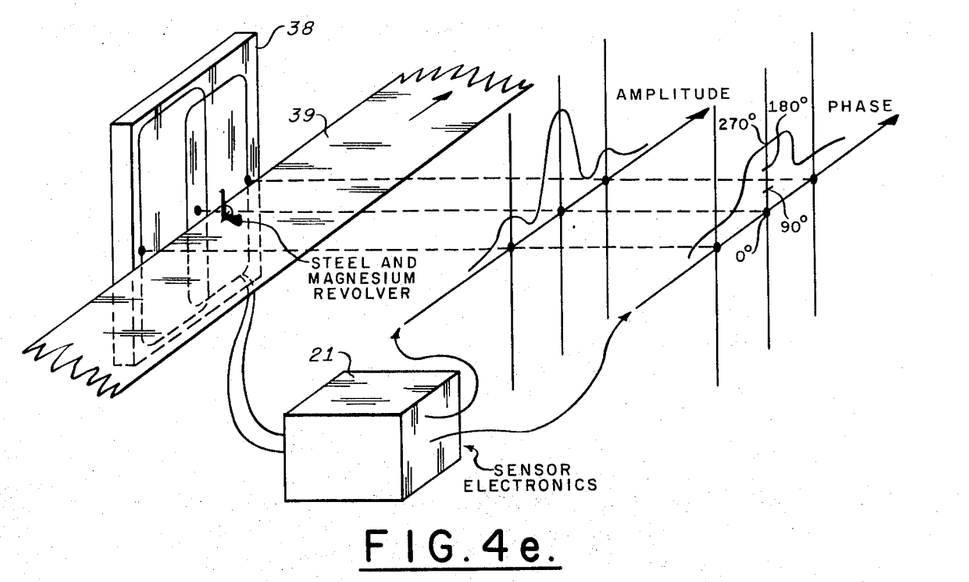
Figure 4F:
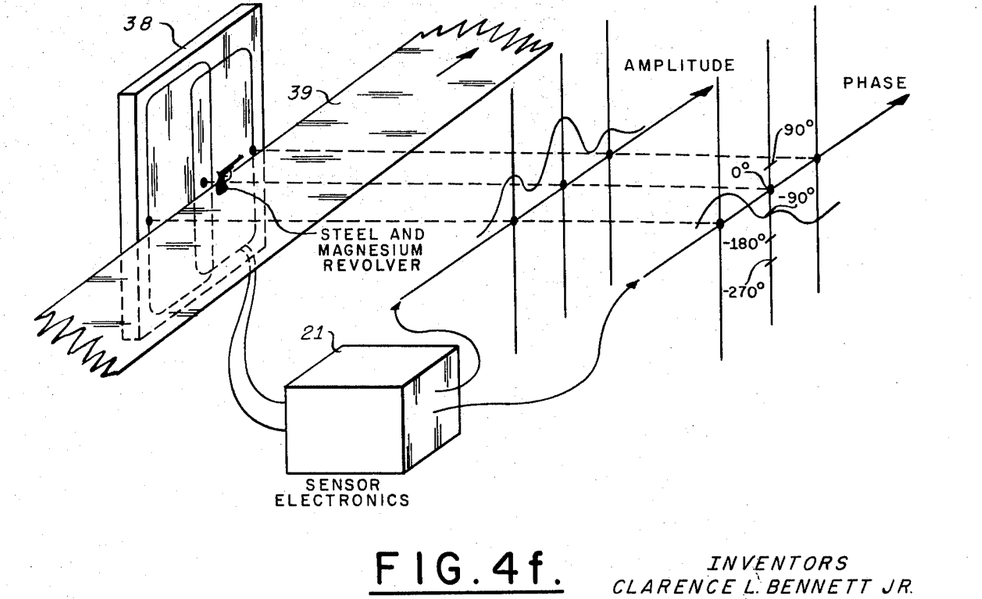

FIGS. 4e and 4f illustrate the waveforms obtained in the case of a revolver constructed of steel and magnesium carried past the detector in vertically and horizontally oriented positions respectively. Again the amplitude waveforms are somewhat similar but the phase waveforms are sufficiently different to enable discrimination between the same object in different orientations. Moreover, from a comparison of all the figures it is seen that objects of various size, shape, orientation and ferrous content can be distinguished. Only in the case of FIGS. 4d and 4f relating to the horizontal can and the horizontal revolver are both the amplitude and phase waveforms somewhat similar but nevertheless different enough to enable discrimination.

Figures 5, 6:
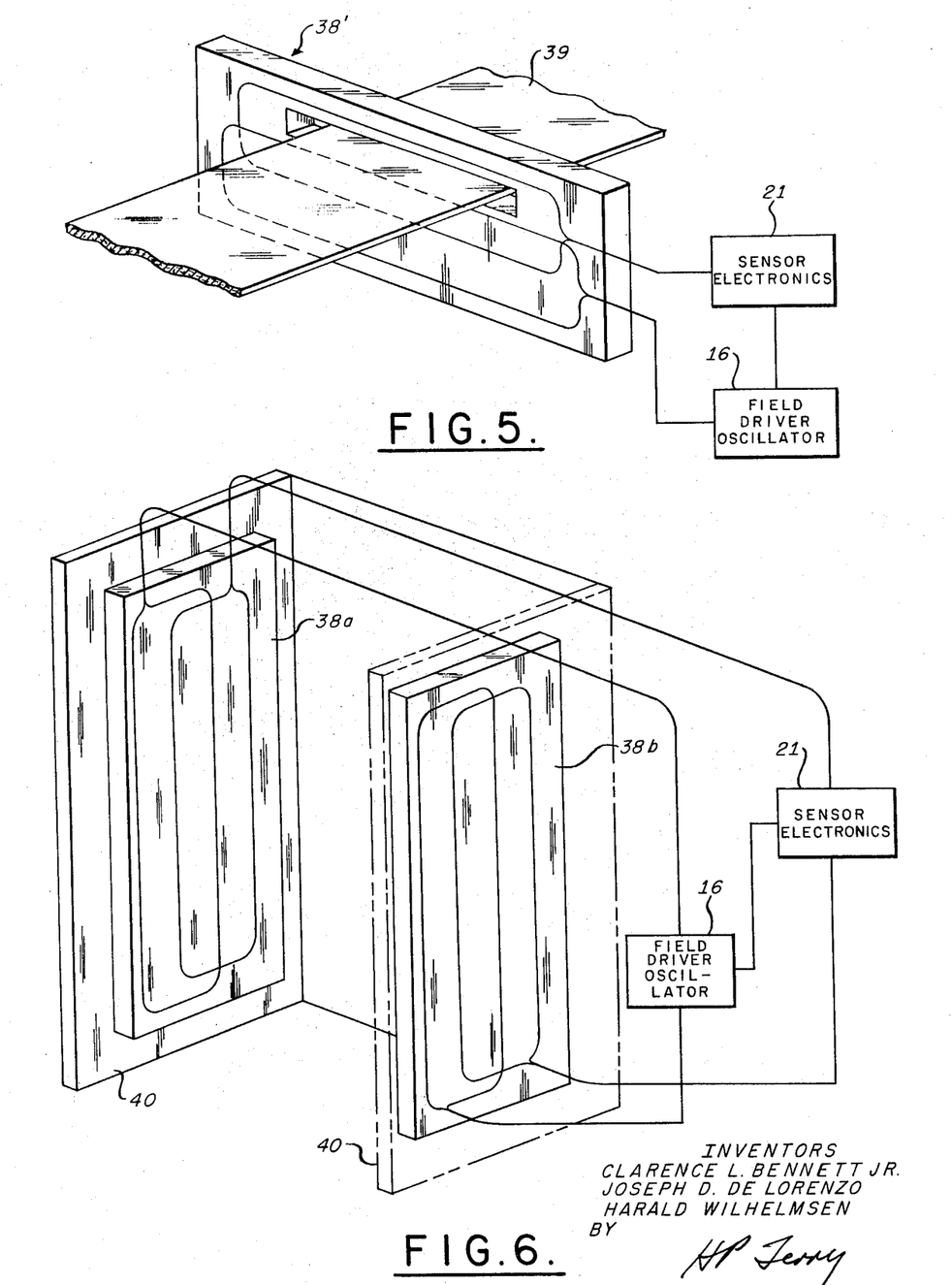
FIG. 5 depicts an alternative construction of the coil and casting assembly adapted for positioning about a conveyor belt.
FIG. 6 shows a dual detector arrangement preferred for use in wide exit and entrance passageways.

Other coil assembly configurations different from that shown in FIG. 1 may be constructed for use in certain applications, as shown in FIG. 5 for instance, where the conveyor belt 39 passes through the sensor coil region of the coil assembly 38'. Such modifications may also be made so that the conveyor belt may pass through the field coil or through the overlapping region of the field and sensor coils, if desired. Obviously though, only rather small objects can be carried on the conveyor belt with this design.

To use the invention in a security system for detecting objects such as revolvers concealed on a person, the coil assembly can be mounted in a passageway through which the persons must pass. In the case where the passageway becomes rather wide, exceeding say 2 feet or so, it is considered advisable to use two coil assemblies 38a, 38b mounted on the passageway walls 40 as shown in FIG. 6. A single field driver oscillator 16 and sensor electronics 21 may be employed in conjunction with both coil assemblies. In operation, the threshold level for indicating presence of a metal object in the passageway would be set so that an object such as a revolver at the maximum distance from either of the coils (2 feet in the case of a 4 feet wide passageway) would produce a signal slightly larger than other objects such as keys normally carried by individuals and passing in close proximity to either one of the coils.

While the invention has been described in its preferred embodiments, it is to be understood that the words which have been used are words of description rather than limitation and that changes within the purview of the appended claims may be made without departing from the true scope and spirit of the invention in its broader aspects.

We claim:

1. Metal detector apparatus comprising
   a coil assembly including a field coil and a sensor coil fixedly secured to one another in partially overlapping substantially minimum mutual inductive coupling relation so that the sensor coil provides a zero or small residual output signal, due to any unbalanced coupling between the coils, under an alternating current electrically energized condition of the field coil in the absence of extraneous metal objects within the detection region of the coil assembly;
   a source of alternating current electrical excitation coupled to the field coil;
   means coupled to the sensor coil for cancelling residual output signal of the sensor coil caused by either unbalanced coupling of the coils or the presence of extraneous metal objects moving at a rate less than a predetermined rate in the coil assembly detection region;
   said residual output signal cancelling means being tuned to a frequency of the electrical excitation applied to the field coil and including means for deriving from the sensor coil a reference signal at the tuned frequency having a phase identical to that of the sensor coil signal, means responsive to the reference signal for producing a nulling signal at the tuned frequency in phase opposition to the sensor coil output signal and variable in amplitude for cancelling the residual output signal of the sensor coil, means for combining the sensor coil output signal and the nulling signal to produce an error signal to the difference in amplitude therebetween and means responsive to the error signal to provide a signal for controlling the amplitude of the nulling signal having a time constant greater than the time required for an object moving at the predetermined rate to pass through the detection region whereby the residual sensor coil output signal is cancelled.

2. Metal detector apparatus for identifying and discriminating between objects of different size, shape, orientation and ferrous content, comprising a coil assembly including a field coil and a sensor coil fixedly secured relative to one another in partially overlapping substantially minimum mutual inductive coupling relation at a location constituting a detection zone so that the sensor coil provides a zero or small residual output signal under an alternating current electrically energized condition of the field coil in the absence of metal objects within the detection zone, a source of alternating current electrical excitation coupled to the field coil, electrically non-conductive conveyor means for carrying an object to be identified past the coil assembly at a predetermined speed so that the object is within the magnetic field produced by the field coil for at least several cycles of the electrical excitation applied thereto, and means coupled to the sensor coil tuned to a frequency of the electrical excitation applied to the field coil including means for cancelling residual signal produced at the output of the sensor coil and additional means for detecting the amplitude and phase of the sensor coil output signal as a function of time produced by an object carried past the coil assembly for presentation of respective amplitude versus time and phase versus time waveform signatures, in accordance with the position of the object relative to the coil assembly, to be compared with prerecorded amplitude and phase waveform signatures representative of a sample object.

* * * * *